H. VANNEMAN & C. ZIMMERLIN.
APPARATUS AND METHOD OF TRANSFERRING AND CANDLING EGGS.
APPLICATION FILED OCT. 20, 1910.
1,000,644.
Patented Aug. 15, 1911.
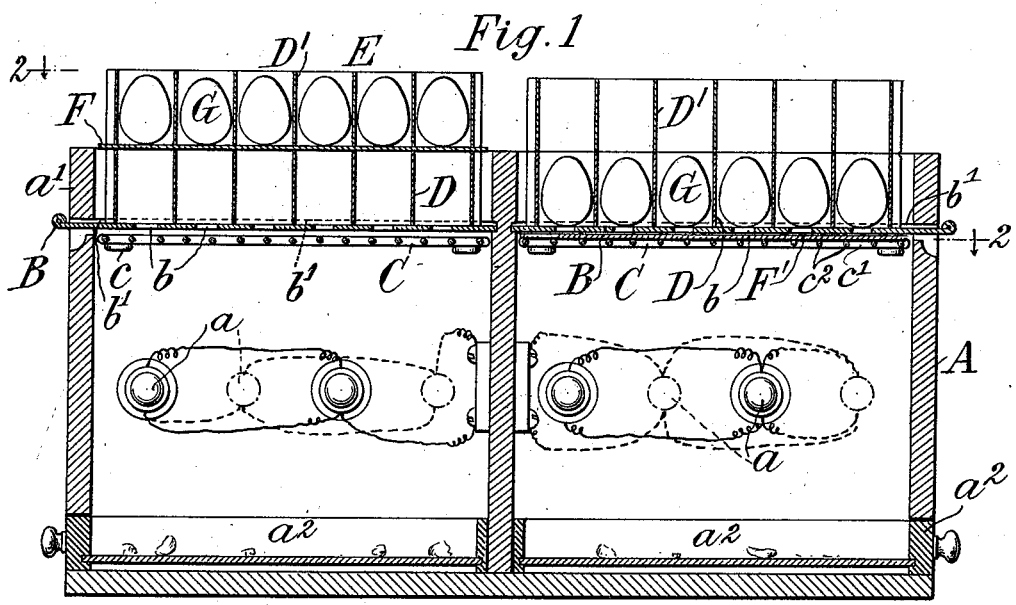
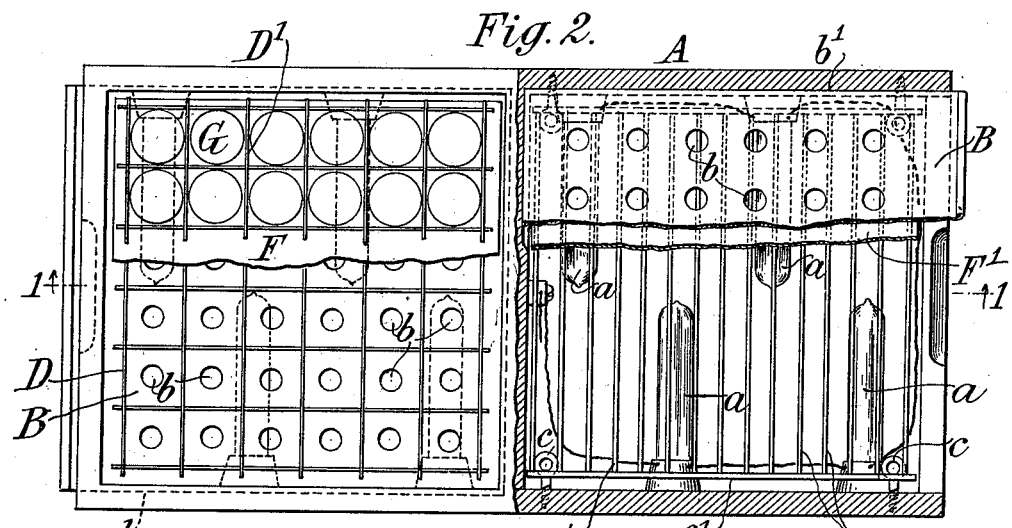
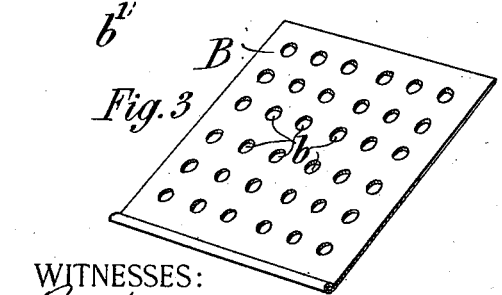
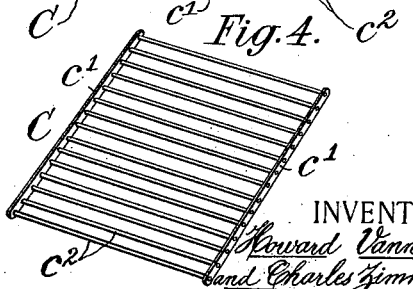
WITNESSES:
INVENTORS:
Howard Vanneman
and Charles Zimmerlin
By Attorneys,

UNITED STATES PATENT OFFICE

HOWARD VANNEMAN AND CHARLES ZIMMERLIN, OF NEW YORK, N. Y.

APPARATUS AND METHOD OF TRANSFERRING AND CANDLING EGGS.

1,000,644.

Specification of Letters Patent.  Patented Aug. 15, 1911.

Application filed October 20, 1910. Serial No. 588,080.

*To all whom it may concern:*

Be it known that we, HOWARD VANNEMAN, and CHARLES ZIMMERLIN, both citizens of the United States, and residents of the borough of Manhattan, city, county, and State of New York, have jointly invented certain new and useful Improvements in Apparatus and Methods of Transferring and Candling Eggs, of which the following is a specification.

Our invention relates to an improvement in the method of candling eggs, and embodies steps whereby we may if desired during the process of such candling, transfer the eggs from an old case to a fresh one, and also to apparatus used in connection with such method.

The method used in candling eggs which has been the same for a great many years, involves the taking of each egg between the fingers and examining it by looking through the egg at a light placed on the other side, whereby any spoiled eggs are easily discovered. Cold storage eggs as they come out of the storage warehouse are usually moist on the outside of the shell, and this is particularly true if the day on which the eggs are withdrawn is humid or very much warmer than the temperature of the eggs, as thereby moisture is caused to condense and deposit upon the shells of the eggs, and it frequently happens also that the egg case fillers in which the eggs are held, which are usually made of straw board, are damp and require to be replaced by fresh and dry fillers.

In candling eggs by the method heretofore in vogue which involved the handling of each egg, they were very apt to become discolored or soiled from the hands, and this reduces the marketable value of the egg.

Our invention therefore aims to provide a method and an apparatus whereby the eggs may be candled, and if desired transferred from a wet egg case to a dry one without any handling, and whereby at the same time the candling of the eggs may be tremendously facilitated, and an enormously increased quantity of eggs candled by a man over what was possible by the former method.

In carrying our invention into effect, we may employ an apparatus such as is illustrated in the accompanying drawings, and which we have found well adapted to the purpose.

In the said drawings,—Figure 1 is a section of the said apparatus; Fig. 2 is a plan view thereof partly in section; Fig. 3 is a detail view of a perforated plate; and Fig. 4 is a similar view of a tray support.

The said apparatus comprises a suitable inclosure, such as a box A, which we have illustrated as double, for the reason that its capacity is thereby increased, although it is not necessarily double. Preferably within the box are contained suitable sources of light, such as electric lamps $a$. Above the box and at the top thereof are the transferring means which as illustrated comprise a sliding plate B which has perforations $b$ so placed that one shall come below each egg. Below the said perforated plate is a tray support C, which may be composed of side bars $c$ $c^1$ which are connected by cross rods $c^2$, or may be constructed in any other convenient manner, as for instance by being formed of ordinary woven wire. The object of this is to support the tray of eggs in carrying out our method, as will be hereinafter explained.

Above the perforated plate B the side walls of the box may well be extended, as at $a^1$, although such extension is not essential. Upon the perforated plate B we place a loose compartment or filler D, which is of the ordinary form of such egg case fillers, and is usually composed of straw board strips locked together and made collapsible when not in use. In carrying out our improved method by the aid of said apparatus, an egg case filler E is placed above the compartment D, and this is composed of a compartment similar to D, and which for convenience we designate $D^1$, and a floor F which is removable by sliding out and is not permanently attached to the filler. The egg case filler E being in place, the bottom F is taken by the fingers and pulled out, whereupon the eggs G will fall into the lower compartment D and their lower ends will rest each upon a perforation $b$ in the plate B. The light from the lamps $a$ will then shine through the perforations $b$ and the condition of the eggs in the compartment D as to whether they are good or bad, may easily be ascertained. The bad eggs having been selected and discarded, a bottom similar to F, but dry, may then be inserted in place under the plate B, and the said plate pulled out lengthwise, permitting the eggs G to drop upon the said bottom which will then be supported by a support C. The old wet filler E may then be thrown away and the new dry filler composed of compartment D and a suitable bottom similar to F may be removed from the box and placed in its case.

On the left hand side of Fig. 1 the eggs are represented as contained within the filler E prior to the removal of the bottom F therefrom. On the right hand side of said figure the bottom F has been removed and a new bottom, which we will designate as F¹, has been inserted preparatory to removing the sliding plate B.

The plate B, as will be perceived, slides in grooves $b^1$ in the sides of the box, thereby maintaining it in position above the plate C, which is supported by any suitable means in the box, as for instance by screws $c$ to permit the insertion of the bottom F¹.

The eggs contained within the compartment D and above the bottom F¹, may be easily removed from the apparatus when the perforated plate B has been withdrawn by lifting out the support C, which is made removable for that purpose, and for the purpose of cleaning, or the said eggs may be removed by simply lifting out the card board bottom F¹. At the lower part of the box a drawer $a^2$ may be provided to receive any broken eggs, egg shells or dirt which may pass through the apparatus and permit the same to be removed.

Our method may well be employed in connection with the apparatus which we have illustrated, although we do not regard it as essential that the said apparatus should be limited to the precise structural details illustrated by us and described herein, nor do we regard it as essential that the precise sequence of steps outlined should be performed in the order given, as the advantages of our invention may well be attained by varying the order of such steps, or the use of equivalent devices or steps.

We claim as our invention:—

1. The method of transferring and candling eggs which consists in placing a tray of eggs supported upon its original tray bottom over a perforated plate, in withdrawing the tray bottom and permitting the eggs to drop on the said perforated plate, in exposing the eggs on said plate to light beneath said plate, in selecting the spoiled eggs by the aid of such light, in inserting a fresh bottom beneath said plate, withdrawing said plate, and removing the complete tray with a fresh bottom, containing the good eggs.

2. The method of transferring and candling eggs which consists in inserting a tray compartment over a perforated plate, in placing a tray of eggs over said tray compartment, in releasing the eggs and permitting them to drop in said compartment and on said perforated plate, in exposing the eggs on said plate to light from beneath said plate, in selecting the bad eggs and in removing the good eggs by inserting a tray bottom beneath said compartment and removing said perforated plate and then removing said complete tray.

3. The method of transferring and candling eggs which consists in inserting a tray compartment over a perforated plate, in placing a tray of eggs over said tray compartment, in releasing the eggs by withdrawing said tray bottom and permitting them to drop in said compartment and on said perforated plate, in exposing the eggs on said plate to light from beneath said plate, in selecting the bad eggs and in removing the good eggs by inserting a tray bottom beneath said perforated plate and then removing said complete tray, whereby the said eggs may be candled and transferred without contact with the hands.

4. The method of candling and transferring eggs which consists in placing a tray of eggs supported upon its original tray bottom above a perforated plate and then removing the bottoms of such tray thereby permitting the eggs to rest in the perforations in said plate and exposing them to light admitted to each egg through said perforations, in selecting the spoiled eggs and transferring the good eggs to a fresh tray by inserting a fresh bottom beneath the tray and transferring the eggs from said perforated plate to said fresh bottom while stationary over said perforated plate and removing the complete tray containing the good eggs from over said plate.

5. An apparatus for candling and transferring eggs comprising a box, a source of light within same, a sliding removable perforated plate above said source of light, said box provided with guides for said plate and a slot in one side through which the said plate may be removed by sliding, and means for supporting eggs above said perforated plate and for retaining them in place when the perforated plate is removed.

6. An apparatus for candling and transferring eggs comprising a box, a source of light within same, a sliding removable perforated plate above said source of light, an opening in the side of the box permitting the removal of said perforated plate by sliding, an egg case compartment above said perforated plate, and means for holding the same in place when the perforated plate is removed.

7. An apparatus for candling and transferring eggs comprising a box, a source of light within same, a sliding removable perforated plate above said source of light, an opening in the side of the box permitting the removal of said perforated plate by sliding, a support below said perforated plate, and means for supporting eggs above said plate, and for holding them in place in the box when the perforated plate is removed.

8. An apparatus for candling and transferring eggs comprising a box, a source of light within same, a sliding removable perforated plate above said source of light, an egg case compartment above said perforated plate, a removable support below said perforated plate, said box provided with a space between said support and said perforated plate to receive a bottom for said compartment.

In witness whereof, we have hereunto signed our names in the presence of two subscribing witnesses.

HOWARD VANNEMAN.
CHARLES ZIMMERLIN.

Witnesses:
J. W. ENDERLE,
T. F. WALLACE.